US009246992B2

(12) United States Patent
Wang

(10) Patent No.: US 9,246,992 B2
(45) Date of Patent: Jan. 26, 2016

(54) VIRTUAL DESKTOP IMPLEMENTATION METHOD, APPARATUS, AND SYSTEM

(71) Applicant: Huawei Technologies Co., Ltd., Shenzhen (CN)

(72) Inventor: Peng Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 24 days.

(21) Appl. No.: 14/476,113

(22) Filed: Sep. 3, 2014

(65) Prior Publication Data

US 2014/0372503 A1 Dec. 18, 2014

Related U.S. Application Data

(63) Continuation of application No. PCT/CN2012/085905, filed on Dec. 5, 2012.

(30) Foreign Application Priority Data

Apr. 5, 2012 (CN) .......................... 2012 1 0097482

(51) Int. Cl.

| | |
|---|---|
| ***H04L 29/08*** | (2006.01) |
| ***G06F 9/455*** | (2006.01) |
| ***G06F 21/53*** | (2013.01) |
| ***G06F 17/30*** | (2006.01) |
| *G06F 3/06* | (2006.01) |

(52) U.S. Cl.

CPC ............ *H04L 67/10* (2013.01); *G06F 9/45533* (2013.01); *G06F 17/30144* (2013.01); (Continued)

(58) Field of Classification Search

CPC ....... H04L 67/10; H04L 67/06; G06F 3/0611; G06F 3/0667; G06F 3/067; G06F 21/53; G06F 9/45533; G06F 17/30144

See application file for complete search history.

(56) References Cited

U.S. PATENT DOCUMENTS

| | | | |
|---|---|---|---|
| 6,907,421 | B1 | 6/2005 | Keshav et al. |
| 2002/0095479 | A1 | 7/2002 | Schmidt |

(Continued)

FOREIGN PATENT DOCUMENTS

| | | | |
|---|---|---|---|
| CN | 101630251 | A | 1/2010 |
| CN | 101650668 | A | 2/2010 |
| CN | 101770399 | A | 7/2010 |
| CN | 102004886 | A | 4/2011 |
| CN | 102158526 | A | 8/2011 |

(Continued)

OTHER PUBLICATIONS

Foreign Communication From a Counterpart Application, Chinese Application No. 201210097482.8, Chinese Notice of Allowance dated Feb. 8, 2014, 1 page.

(Continued)

*Primary Examiner* — Larry Donaghue

(74) *Attorney, Agent, or Firm* — Conley Rose, P.C.; Grant Rodolph

(57) ABSTRACT

A virtual desktop implementation method, apparatus, and system are provided. A monitor program intercepts a file access request of an application program, and obtains file operation information of the file access request, where the file operation information includes a storage location and an operation type of a to-be-accessed file; the monitor program determines a file type of the to-be-accessed file according to the storage location of the to-be-accessed file, where the file type includes a system file and a program file; sends the file access request to a to-be-accessed file in a local virtual operating system folder when the file type is a system file; and sends the file access request to a to-be-accessed file in a program folder in a local or remote device when the file type is a program file. Accordingly running speeds of a virtual desktop and an application on the virtual desktop are improved.

19 Claims, 2 Drawing Sheets

(52) U.S. Cl.

CPC ................ *G06F21/53* (2013.01); *H04L 67/06* (2013.01); *G06F 3/067* (2013.01); *G06F 3/0611* (2013.01); *G06F 3/0667* (2013.01)

(56) References Cited

U.S. PATENT DOCUMENTS

| | | | | |
|---|---|---|---|---|
| 2005/0188227 | A1 | 8/2005 | Jooste | |
| 2009/0328033 | A1 * | 12/2009 | Kohavi | G06F 9/5027 718/1 |
| 2010/0037040 | A1 | 2/2010 | Hsieh | |
| 2011/0321040 | A1 | 12/2011 | Sobel et al. | |
| 2012/0005269 | A1 * | 1/2012 | Janssen | G06F 3/0481 709/203 |
| 2012/0226742 | A1 * | 9/2012 | Momchilov | G06F 3/0481 709/203 |
| 2013/0198748 | A1 | 8/2013 | Sharp et al. | |

FOREIGN PATENT DOCUMENTS

| | | | |
|---|---|---|---|
| CN | 102355502 | A | 2/2012 |
| CN | 102368201 | A | 3/2012 |
| CN | 102662741 | A | 9/2012 |
| GB | 2476878 | A | 7/2011 |
| WO | 2009108579 | A2 | 9/2009 |

OTHER PUBLICATIONS

Foreign Communication From a Counterpart Application, Chinese Application No. 201210097482.8, English Translation of Chinese Notice of Allowance dated Feb. 8, 2014, 3 pages.

Foreign Communication From a Counterpart Application, Chinese Application No. 201210097482.8, English Translation of Chinese Office Action dated Aug. 2, 2013, 7 pages.

Foreign Communication From a Counterpart Application, Chinese Application No. 201210097482.8, Chinese Office Action dated Oct. 30, 2013, 3 pages.

Foreign Communication From a Counterpart Application, Chinese Application No. 201210097482.8, English Translation of Chinese Office Action dated Oct. 30, 2013, 6 pages.

Partial English Translation and Abstract of Chinese Patent Application No. CN102004886A, Nov. 17, 2014, 4 pages.

Partial English Translation and Abstract of Chinese Patent Application No. CN102662741A, Sep. 9, 2014, 4 pages.

Foreign Communication From a Counterpart Application, PCT Application No. PCT/CN2012/085905, International Search Report dated Mar. 28, 2013, 2 pages.

Foreign Communication From a Counterpart Application, PCT Application No. PCT/CN2012/085905, Written Opinion dated Mar. 28, 2013, 7 pages.

Foreign Communication From a Counterpart Application, Chinese Application No. 201210097482.8, Chinese Report dated May 25, 2013, 10 pages.

Foreign Communication From a Counterpart Application, Chinese Application No. 201210097482.8, Chinese Office Action dated Aug. 2, 2013, 4 pages.

Foreign Communication From a Counterpart Application, Chinese Application No. 201210097482.8, Chinese Search Report dated Apr. 5, 2012, 1 page.

Sapuntzakis, C., et al., "Optimizing the Migration of Virtual Computers," Proceedings of the Fifth Symposium on Operating Systems Design and Implementation, Dec. 9, 2002, 14 pages.

Foreign Communication From a Counterpart Application, European Application No. 12873618.8, Extended European Search Report dated Jan. 19, 2015, 11 pages.

* cited by examiner

VIRTUAL DESKTOP IMPLEMENTATION METHOD, APPARATUS, AND SYSTEM

CROSS-REFERENCE TO RELATED APPLICATIONS

This application is a continuation of International Application No. PCT/CN2012/085905, filed on Dec. 5, 2012, which claims priority to Chinese Patent Application No. 201210097482.8, filed on Apr. 5, 2012, both of which are hereby incorporated by reference in their entireties.

TECHNICAL FIELD

The present invention relates to the field of computer and communication technologies, and in particular, to a virtual desktop implementation method, apparatus, and system.

BACKGROUND

By applying a virtual desktop technology, a user may use another desktop to perform a file access operation, and install and run an application program without using a desktop of a local operating system. An implementation method may be running of a user desktop program, access to an operating system file during running of an application program, operation processing executed during running of the application program, and so on are completed using virtualized computing resources and storage resources on a virtual machine; and a user side may access a remote virtual machine through an access device such as a thin client or a software client and in a manner of a remote desktop, and running results of a desktop program and an application program on the virtual machine are transmitted to the user side through a network for being displayed.

The foregoing virtual desktop implementation method has the following technical defects. The desktop program and the application program started through the desktop program are run in the remote virtual machine, an operation involved in a running process, for example, access to a system file of the operating system, is executed in a virtual machine side, and a running result is transmitted to the user side through the network for being displayed, so that a running speed of the virtual desktop is slow.

SUMMARY

The present invention provides a virtual desktop implementation method, apparatus, and system, so as to improve a running speed of a virtual desktop.

In a first aspect, the present invention provides a virtual desktop implementation method, including: after an application program in a local host is started through a predetermined user desktop program, intercepting, by a monitor program, a file access request of the application program, and obtaining file operation information of the file access request, where the file operation information includes a storage location and an operation type of a to-be-accessed file, and the operation type includes read and write; determining, by the monitor program and according to the storage location of the to-be-accessed file, a file type of the to-be-accessed file, where the file type includes a system file of an operating system and a program file of the application program; processing, by the monitor program, the file access request according to the file type, so as to implement a virtual desktop, which includes sending the file access request to a to-be-accessed file in a local virtual operating system folder if the file type is a system file, where a file structure in the virtual operating system folder is the same as a file structure in a host operating system folder, and storage locations of the virtual operating system folder and the host operating system folder are different and sending the file access request to a to-be-accessed file in a program folder in a local or remote device if the file type is a program file.

In another aspect, the present invention provides a virtual desktop implementation apparatus, including: a monitoring and intercepting module configured to, after an application program is started through a predetermined user desktop program, intercept a file access request of the application program; a determining module configured to obtain file operation information of the file access request intercepted by the monitoring and intercepting module, where the file operation information includes a storage location and an operation type of a to-be-accessed file, and the operation type includes read and write and determine, according to the storage location of the to-be-accessed file, a file type of the to-be-accessed file, where the file type includes a system file of an operating system and a program file of the application program; and a processing module configured to process the file access request according to the file type, so as to implement a virtual desktop, and including a first processing unit configured to send the file access request to a to-be-accessed file in a local virtual operating system folder if the file type is a system file, where a file structure in the virtual operating system folder is the same as a file structure in a host operating system folder, and storage locations of the virtual operating system folder and the host operating system folder are different; and a second processing unit configured to send the file access request to a to-be-accessed file in a program folder in a local or remote device if the file type is a program file.

In still another aspect, the present invention provides a virtual desktop implementation system, including a host and a remote device, where a virtual operating system folder and the virtual desktop implementation apparatus of the present invention are integrated into the host.

In the virtual desktop implementation solutions provided by embodiments of the present invention, the monitor program obtains the file operation information of the application program, and controls, according to the file operation information, the application program to execute file access, for example, to access a system file located in a local virtual operating system, and access a program file in the local or remote device, and because the user desktop program is directly and locally started, the system file is also locally accessed, and an execution result of the file access is also directly displayed through a local user desktop program without the need of frequent network transmission in the prior art, a time loss brought by the network transmission may be reduced and running speeds of the virtual desktop and an application on the virtual desktop may be greatly improved.

DESCRIPTION OF EMBODIMENTS

Embodiment 1

Figure 1:
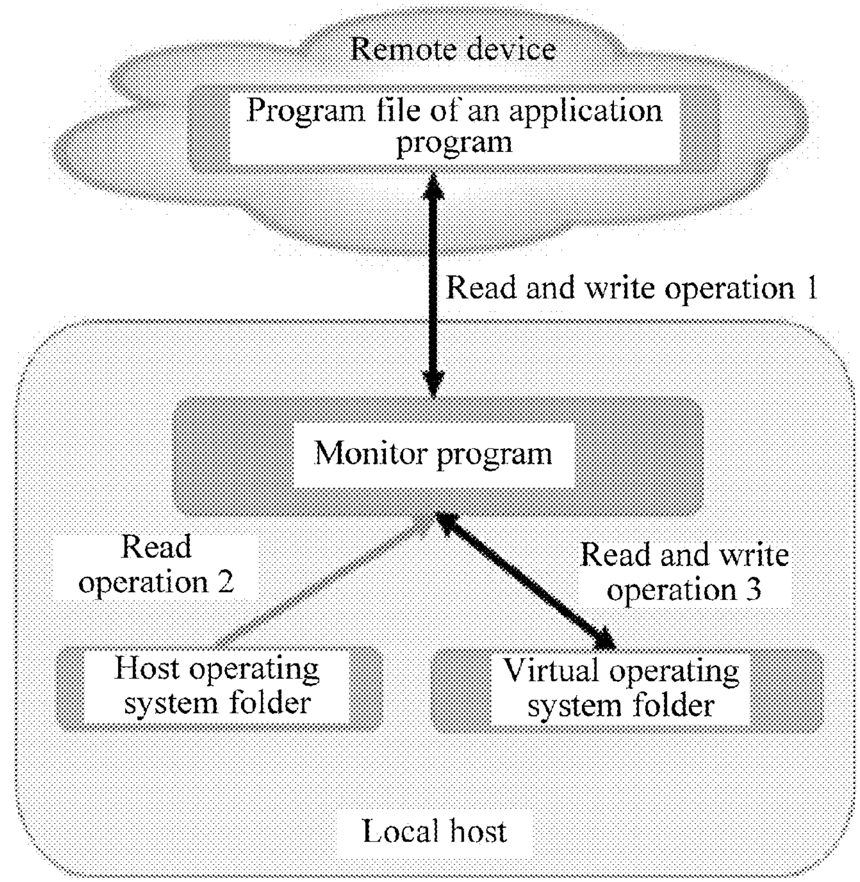
FIG. 1 is a schematic diagram of an application of an embodiment of a virtual desktop implementation method according to the present invention.
Figure 2:
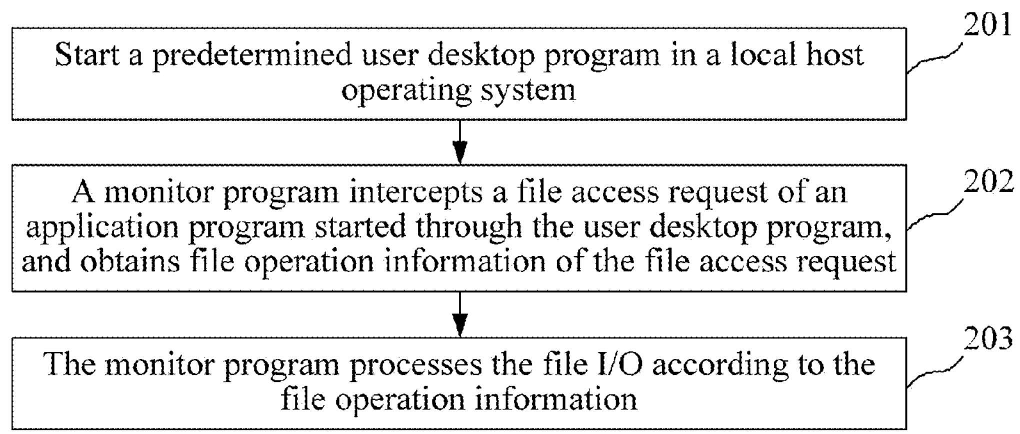
FIG. 2 is a schematic flowchart of an embodiment of a virtual desktop implementation method according to the present invention.

FIG. 1 is a schematic diagram of an application of an embodiment of a virtual desktop implementation method according to the present invention, and FIG. 2 is a schematic flowchart of an embodiment of a virtual desktop implementation method according to the present invention. A virtual desktop implementation method of this embodiment is described in the following with reference to FIG. 1 and FIG. 2.

As shown in FIG. 1, the virtual desktop implementation method provided by this embodiment is executed by a virtual desktop implementation system, and the implementation system may include a host and a remote device, where a predetermined user desktop program, a monitor program, and an application program are run on the host, and the predetermined user desktop program is not shown in FIG. 1. That the implementation system implements a virtual desktop mainly refers to that the predetermined user desktop program (the desktop program is different from a desktop program in a host operating system) is first started, and then, another application program is started through the predetermined user desktop program, and the monitor program is responsible for controlling a file operation during running of an application. Reference is made to the following description in FIG. 2 for a detailed implementation method.

As shown in FIG. 2, the implementation method may include:

201: Start a predetermined user desktop program in a local host operating system.

It should be noted that, the user desktop program is also an application program, and is used to provide a user interface for a user, so as to implement interaction between the user and an operating system. Each user desktop program has a corresponding storage space where desktop environment information such as a desktop layout parameter and a background color is stored. After the user desktop program is started, a process of the user desktop program that is generated correspondingly reads the foregoing desktop environment information, and a seen interface is similar to a common computer host desktop, or a mobile phone interface, or the like, and for example, when the local refers to a computer, the user desktop is a computer desktop, and when the local refers to a mobile terminal, the user desktop is a mobile terminal desktop such as a mobile phone desktop. An interface formed after the user desktop program is started is called a desktop in the following.

Optionally, the user desktop program in this embodiment may be stored in a mobile storage device or stored in a local host storage device, where the mobile storage device may be, for example, a universal serial bus (USB) disk, a mobile hard disk drive, or a secure digital memory (SD) card. By storing a user desktop program in a mobile storage device, a user not only can conveniently carry but also can conveniently start the user desktop program anywhere anytime without a limitation of an access device such as a thin client, and can implement use of a virtual desktop in a plug-and-play manner through the mobile storage device anywhere. An example is taken for description: For example, the user desktop program is deployed on a USB disk, and after the USB disk is inserted into a local computer host, the user desktop program may be started to form a virtual desktop to replace an original computer desktop of the host; and the virtual desktop is deployed on a SD card, and a user may start the virtual desktop on the SD card to replace an original desktop on a mobile phone.

Further, a starting process of the user desktop program is implemented through a multi-desktop mechanism supported by the local host operating system, for example, a USB disk stores the user desktop program and further stores a monitor program (may also be called a virtualized engine), and when the USB disk is inserted into the host, the host operating system detects whether the USB disk stores the monitor program. If yes, the host operating system automatically runs the monitor program, and after being run, the monitor program is responsible for reading and starting the user desktop program in the USB disk according to a preset configuration item, so as to form a virtual desktop having an interface form that is commonly seen and enable the virtual desktop to replace a local host desktop. The host operating system creates a workstation for the virtual desktop, and injects a dynamic library of the monitor program into an explorer process of the workstation, and in this way, the monitor program may be enabled to monitor file operation information (reference is made to relevant materials of an application programming interface (API) hook technology for specific content) of an application program started through the virtual desktop. Because an operating system supports the multi-desktop mechanism, when multiple user desktop programs exist in a host and an external storage device connected to the host, the virtual desktop in this embodiment may be implemented based on a designated user desktop program, for example, a first user desktop program stored in a mobile storage device, and subsequently, the monitor program only intercepts and processes a file access request generated by an application program installed or started based on the first user desktop program without affecting another user desktop program, and the another user desktop programs still works according to an original mechanism of the host operating system.

202: A monitor program intercepts a file access request of an application program started through the user desktop program, and obtains file operation information of the file access request.

After the user desktop program is started and the monitor program is injected into a corresponding process of the user desktop program in 201, the monitor program may monitor a subsequent file access request generated by an application program started or installed through the virtual desktop. The application described herein refers to an application program such as the Word 2003 and Excel 2003 of the Microsoft (MS) Office series and the Kingsoft PowerWord. For example, when a user runs an installation package (the installation package may be pre-stored in a mobile storage device such as a USB disk, and certainly, may also be stored in another place such as a local host storage device) of an application program during installation of the application program through the virtual desktop, an installation process of the application program creates a program folder of the application program in a designated directory of a file system, and in this case, a file access request is generated; or after a user clicks, through the virtual desktop, an icon (a shortcut icon) corresponding to an installed application program, a working process of the application program reads data in some files in a program folder of the application program, and in this case, a file access request is also generated.

A file access request (file input/output (I/O)) to access a certain file in the file system is generated when the application program is started, and the monitor program intercepts the file I/O of the application program and obtains file operation information carried in the I/O; the file operation information described herein includes a storage location (that is, a storage path) of a to-be-accessed file and an operation type of the file, where the operation type includes read or write, and a type of the to-be-accessed file includes a system file of an operating system and a program file of an application, and optionally, further includes a running file of the application.

The system file of the operating system refers to all files relevant to running of the operating system, and file data such as a registry, the program file refers to a relevant file in an installation process of the application program, and the running file refers to a file that can be created, opened, or modified through the application program. An example is taken for description: By taking an application program of the Microsoft Office series as an example, the office accesses a system file (for example, a file in an operating system folder "C: \WINDOWS" in a system disk, C disk) of an operating system when being started, and executes a corresponding operation such as read and write of a file, and further accesses a program file of the application, where the program file refers to a file generated when MS Office is installed (for example, a file in a folder "C:\Program Files\Microsoft Office" corresponding to the application program); and an access to a running file is also generated, where the running file refers to a file generated using the MS Office, for example, a document (for example, a file of which a suffix is ".doc") written using Word.

Optionally, not all application programs access files of the foregoing three types when being installed or started, for example, an application program of the Microsoft Office series accesses files of the foregoing three types when being installed or started; however, an application program of the Kingsoft PowerWord only accesses a system file and a program file without generating or involving a running file when being installed or started.

203: The monitor program processes the file I/O according to the file operation information.

The monitor program controls the application to execute file access according to the file operation information obtained in 202, and performs redirection on the access I/O of the application program. Optionally, the monitor program may know, according to a storage location of a file in the file operation information, that what to be accessed by the application program is a system file, a program file, or a running file, that is, the monitor program determines, according to a storage location of a to-be-accessed file, a file type of the to-be-accessed file. For example, the monitor program prestores storage paths (the storage paths may be pre-designated or recorded in an installation process of the application program) of a system folder and a program folder, and after intercepting the file I/O and obtaining the storage location in file operation information, determines whether the storage location is in the storage path of the system folder or the storage path of the program folder, if the storage location is in the storage path of the system folder, it indicates that the to-be-accessed file is a system file, and if the storage location is in the storage path of the program folder, it indicates that the to-be-accessed file is a program file; otherwise, it indicates that the to-be-accessed file is a running file.

Further, if what to be accessed by the file I/O of the application program is a system file of an operating system, no matter whether the operation type is read or write, whether a to-be-accessed system file exists in a virtual operating system folder is first detected. A file structure in the virtual operating system folder is the same as a file structure in a host operating system folder, and storage locations of the folders are different, for example, the storage location of the host operating system folder is C:\WINDOWS, and the storage location of the virtual operating system folder is F:\V-WINDOWS. If the to-be-accessed file exists in the virtual operating system folder, the file I/O of the application program to a local operating system folder is directly redirected to the virtual operating system folder, and if the to-be-accessed file does not exist in the virtual operating system folder, the monitor program executes different processing according to the operation information of the file I/O.

For example, if the operation type is write, after obtaining a system file to be accessed by the application program from a system folder of the local host operating system, and duplicating (that is, copying) the system file into the virtual operating system folder, the monitor program redirects the file I/O of the application program to the virtual operating system folder, that is, enables the application program to execute a write operation on the system file of the virtual operating system folder. The file structure in the virtual operating system folder is the same as the file structure in the host operating system folder, and in this embodiment, after the user desktop program is started, the monitor program may logically combine the system file of the virtual operating system and the system file of the host operating system, that is, combines file path structures, so that the application seems to have only one operating system locally and have only one system file of the operating system. However, the storage locations of the two are actually different as described in the foregoing, for example, the system file in the virtual operating system folder is stored in a mobile storage device, which is isolated from the storage location of the system file of the host operating system, and the monitor program controls specific file access.

An example is taken to describe the foregoing processing of the write operation on the system file. Because it may not be known in advance that which specific files in system files will be accessed by a certain application program when the certain application program is started, only some empty file subdirectories may exist in the virtual operating system folder stored in a USB disk initially, and the system file in the virtual operating system folder has the same file path structure as that of the system file in the local host operating system folder, for example, the host operating system folder is C:\WINDOWS\ and the path includes subdirectories such as C:\WINDOWS\system32 and C:\WINDOWS\system, and the virtual operating system folder is F:\V-WINDOWS, and the path also includes subdirectories such as F:\V-WINDOWS\system32 and F:\V-WINDOWS\system, that is, the virtual operating system folder has the same file path structure as that of the system file folder of the host operating system; however, only some empty subfolders exist, in another word, all subdirectories do not include a file, and only form a file path structure. When an application is installed for the first time, a system file to be accessed by the application program does not exist in the virtual operating system folder, so that the monitor program may obtain the to-be-accessed system file from the system folder of the local host operating system, and duplicate the to-be-accessed system file into the virtual operating system folder, that is, copy the system file to be accessed by the application program from the system folder of the local host operating system into the same file directory of the virtual operating system folder, and then control the application program to access the system file in the virtual operating system folder, for example, to perform a read and write operation (a read and write operation 3 shown in FIG. 1) on the file. Certainly, after being copied for the first time, the system file may be continually stored in the virtual operating system folder; in this way, subsequently, if the system file needs to be accessed again when the application program is run again, the system file may be directly accessed in the virtual operating system folder without the need of copying.

For example, if the operation type is read, the monitor program may adopt a processing manner similar to that adopted when the operation type is write, and after obtaining a system file to be accessed by the application program from a system folder of the local host operating system, and duplicating (that is, copying) the system file into the virtual operating system folder, redirect the file I/O of the application program to the virtual operating system folder, that is, enable the application program to execute a read operation on the system file in the virtual operating system folder; and the monitor program may also not execute the foregoing processing of copying the system file in the host operating system into the virtual operating system folder, but directly send the file I/O of the application program to the host operating system folder, that is, control the application program to access the to-be-accessed system file in the local host operating system folder (a read operation 2 in FIG. 1), and because the read operation does not modify the system file in the host operating system folder, no impact is generated on running of the host operating system and storage resources may be further saved.

By redirecting the access of the application program to the system file to the virtual operating system folder, no impact is generated on the system file of the local host operating system, and modification generated on the system file may be stored into a mobile storage device (that is, the virtual operating system folder may be stored in the mobile storage device), where the mobile device can be conveniently carried, and the virtual operating system can be plugged and played which is not dependent on a certain terminal such as a certain computer, and meets a requirement for mobile officing.

Further, if what to be accessed by the file I/O of the application program is a program file of the application program, the monitor program may control execution of an access to the program file in the program folder, where in specific implementation, the program folder may be stored in a remote device such as a cloud computing center, or may also be locally stored, for example, may be stored in a mobile storage device connected to a host, as the virtual operating system folder. The monitor program may redirect the file I/O of the application program to the program folder according to a preset storage location of the program folder.

For example, when the program folder of the application program is stored in a remote device such as a cloud computing center, when identifying that the to-be-accessed file is the program file, the monitor program controls the file I/O to access a program file in a program folder stored in the cloud computing center (a read and write operation 1 shown in FIG. 1), where the program file is directly created in a storage space provided by the cloud computing center when the application program is installed. When the program folder of the application program is locally stored, and when determining that the file to be accessed by the file I/O is the program file, the monitor program sends the file I/O to the locally stored program folder (the read and write operation 3 shown in FIG. 1), where the program file is directly created in a local storage space when the application program is installed.

In a running process after the application program is installed, when accesses to the system file and the program file are involved, a processing manner for the generated file I/O is the same as the foregoing description, and is not repeatedly described herein. Further, if what to be accessed by the application program is a running file of the application program, the monitor program executes the following operations. For example, the monitor program may detect whether a remote device stores a running folder of the application program, if not, it is generated for the first time, and the monitor program creates the running folder of the application program in a cloud computing center, and then locally create a running file, and stores the running file into the created running folder on the cloud computing center after executing the file I/O in the running file using a local computing resource, and if the running folder of the application program exists in the cloud computing center, the monitor program may locally cache the to-be-accessed file in the running folder of the remote device, send the file access request to the locally cached to-be-accessed file, process the file I/O using the local computing resource, and update, according to the locally cached to-be-accessed file that has been processed, the to-be-accessed file in the running folder of the remote device. That is, the running file must be stored in the remote device such as the cloud computing center; however, an operation involved file access is still processed using the local computing resource.

Optionally, in this embodiment, executable files used to implement the monitor program, the application program, and the predetermined user desktop program, and the virtual operating system folder are stored in a mobile storage device connected to the local host.

After the monitor program completes processing of the file I/O according to the file operation information, an execution result of the file access is displayed through the predetermined user desktop program.

It can be seen from the foregoing description of the virtual desktop implementation method of this embodiment that, when this embodiment is compared with the virtual desktop implementation method in the prior art, in this embodiment, computing and storage are mainly separated, that is, the running file of the application program is still stored in the cloud computing center; however, processing on the running file, and computing (the computing herein refers to an operation such as read and write access to a file and running of an application program) such as read and write access to the system file and the program file are locally performed, if that a device such as a central processing unit (CPU), memory, or cache needs to be used to cache and operate data is involved during the file access, a computing resource such as a local CPU, memory, or cache may be directly used without using a computing resource of the cloud end, so as to greatly lower a computing cost of the remote device; and because the user desktop program is also directly and locally started, and the application program also directly accesses the local system file when being started without the need of network transmission in the prior art, a running speed of the virtual desktop is greatly improved, and in this embodiment, a sandbox technology is adopted to run the user desktop program and an application program on the user desktop program, so that when the user desktop program and an application program started based on the user desktop program access an infected file on the host operating system, the file access operation is redirected to the virtual operating system folder, thereby effectively lowering a probability of virus infection; therefore, compared with a virtual desktop in a manner of a conventional cloud computing virtual machine, the cloud computing center does not need to deploy security software of the operating system, which obviously lower a management cost of the remote device.

Embodiment 2

Figure 3:
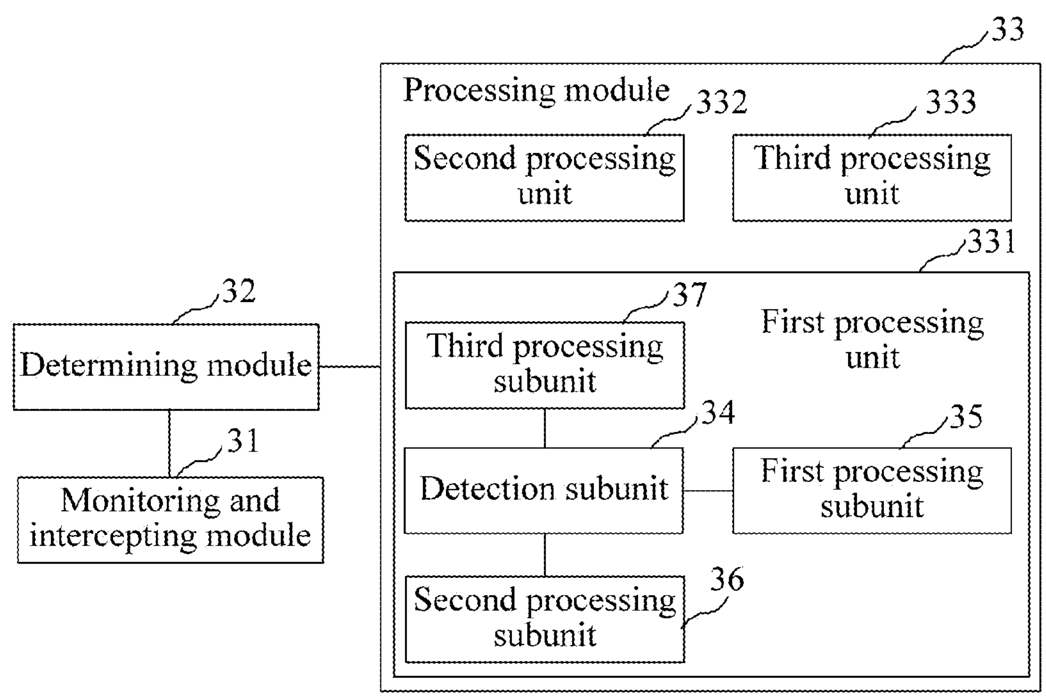
FIG. 3 is a schematic structural diagram of an embodiment of a virtual desktop implementation apparatus according to the present invention.

FIG. 3 is a schematic structural diagram of an embodiment of a virtual desktop implementation apparatus according to the present invention. The apparatus can execute the virtual desktop implementation method of any embodiment of the present invention, a structure of the apparatus is only briefly described in this embodiment, and for a specific working principle of the apparatus, a reference may be made to the description of the method embodiment.

As shown in FIG. 3, in this embodiment, the virtual desktop implementation apparatus may include a monitoring and intercepting module 31, a determining module 32, and a processing module 33, where the monitoring and intercepting module 31 is configured to, after an application program is started through a predetermined user desktop program, intercept a file access request of the application program; the determining module 32 is configured to obtain file operation information of the file access request intercepted by the monitoring and intercepting module 31, where the file operation information includes a storage location and an operation type of a to-be-accessed file, and the operation type includes read and write and determine, according to the storage location of the to-be-accessed file, a file type of the to-be-accessed file, where the file type includes a system file of an operating system and a program file of the application program; and the processing module 33 is configured to process the file access request according to the file type, so as to implement a virtual desktop. The processing module 33 includes: a first processing unit 331 and a second processing unit 332, where the first processing unit 331 is configured to send the file access request to a to-be-accessed file in a local virtual operating system folder if the file type is a system file, where a file structure in the virtual operating system folder is the same as a file structure in a host operating system folder, and storage locations of the folders are different; and the second processing unit 332 is configured to send the file access request to a to-be-accessed file in a program folder in a local or remote device if the file type is a program file.

Optionally, when the file type determined by the determining module 32 further includes a running file of the application program, the processing module 33 further includes a third processing unit 333 configured to send the file access request to a to-be-accessed file in a running folder in the remote device if the file type is a running file.

Optionally, the first processing unit 331 includes: a detection subunit 34, a first processing subunit 35, a second processing subunit 36, and a third processing subunit 37, where the detection subunit 34 is configured to, when the file type is the system file, detect whether a to-be-accessed file exists in the local virtual operating system folder; the first processing subunit 35 is configured to, if a detection result of the detection subunit is yes, send the file access request to the virtual operating system folder, and access the to-be-accessed file in the virtual operating system folder; the second processing subunit 36 is configured to, if the detection result of the detection subunit is no, and when the operation type of the file access request is write, duplicate a to-be-accessed file in a local host operating system folder into the virtual operating system folder, and execute, according to the file access request, a write operation on the to-be-accessed file in the virtual operating system folder; and the third processing subunit 37 is configured to, if the detection result of the detection subunit is no, and when the operation type is read, send the file access request to the local host operating system folder, and execute, according to the file access request, a read operation on the to-be-accessed file in the local host operating system folder, or duplicate the to-be-accessed file in the local host operating system folder into the virtual operating system folder, and execute, according to the file access request, a read operation on the to-be-accessed file in the virtual operating system folder.

Through the virtual desktop implementation apparatus of this embodiment, the file operation information of the application program is obtained, and the file access request of the application program is processed according to the storage location and the operation type of the to-be-accessed file in the file operation information, for example, the file access request is sent to the to-be-accessed file in the local virtual operating system folder, or the file access request is sent to the to-be-accessed file in the program folder in the local or remote device, and the file access of the application program is processed by directly using a local computing resource, and a running result is directly and locally displayed without the need of frequent network transmissions in the prior art; therefore, running speeds of the virtual desktop and an application on the virtual desktop are greatly improved.

Embodiment 3

The present invention further provides a virtual desktop implementation system, and the system includes a host and a remote device, where a virtual operating system folder and the virtual desktop implementation apparatus according to any embodiment of the present invention are integrated into the host.

Reference may be made to the description of any method embodiment and apparatus embodiment of the present invention for the virtual operating system folder, a structure of the virtual desktop implementation apparatus, and a virtual desktop implementation principle of the virtual desktop implementation system, which are not repeatedly described herein.

Persons of ordinary skill in the art may understand that all or a part of the steps in each of the foregoing method embodiments may be implemented by a program instructing relevant hardware. The foregoing program may be stored in a computer readable storage medium. When the program is run, the steps in each of the foregoing method embodiments are performed. The storage medium includes any medium that is capable of storing program codes, such as a read-only memory(ROM), a random access memory(RAM), a magnetic disk, or an optical disk.

Finally, it should be noted that the foregoing embodiments are merely intended for describing the technical solutions of the present invention, rather than limiting the present invention. Although the present invention is described in detail with reference to the foregoing embodiments, persons of ordinary skill in the art should understand that they may still make modifications to the technical solutions described in the foregoing embodiments, or make equivalent replacements to a part or all of the technical features of the technical solutions described in the foregoing embodiments; however, these modifications or replacements do not make the essence of the corresponding technical solutions depart from the scope of the technical solutions of the embodiments of the present invention.

What is claimed is:

1. A virtual desktop implementation method, comprising:

intercepting, by a monitor program, a file access request of an application program after the application program in a local host is started through a predetermined user desktop program;

obtaining file operation information of the file access request, wherein the file operation information comprises a storage location and an operation type of a to-be-accessed file, and wherein the operation type comprises read and write;

determining, by the monitor program and according to the storage location of the to-be-accessed file, a file type of the to-be-accessed file, wherein the file type comprises a system file of an operating system and a program file of the application program; and processing, by the monitor program, the file access request according to the file type so as to implement a virtual desktop, which comprises:

sending the file access request to a to-be-accessed file in a local virtual operating system folder when the file type is a system file, wherein a file structure in the virtual operating system folder is the same as a file structure in a host operating system folder, and wherein storage locations of the virtual operating system folder and the host operating system folder are different; and sending the file access request to a to-be-accessed file in a program folder in a local or remote device when the file type is a program file.

2. The virtual desktop implementation method according to claim 1, wherein sending the file access request to a to-be-accessed file in the local virtual operating system folder comprises:

detecting whether a to-be-accessed file exists in the local virtual operating system folder when the file type is the system file;

sending the file access request to the virtual operating system folder and accessing the to-be-accessed file in the virtual operating system folder when the to-be-accessed file exists in the local virtual operating system folder;

duplicating a to-be-accessed file in a local host operating system folder into the virtual operating system folder when the to-be-accessed file does not exist in the local virtual operating system folder and the operation type of the file access request is write; and executing, according to the file access request, a write operation on the to-be-accessed file in the virtual operating system folder.

3. The virtual desktop implementation method according to claim 2, wherein executable files used to implement the monitor program, the application program, the predetermined user desktop program, and the virtual operating system folder are stored in a mobile storage device connected to the local host.

4. The virtual desktop implementation method according to claim 2, wherein the to-be-accessed file does not exist in the virtual operating system folder and the operation type is read, and wherein the method further comprises:

sending the file access request to the local host operating system folder; and executing, according to the file access request, a read operation on the to-be-accessed file in the local host operating system folder.

5. The virtual desktop implementation method according to claim 4, wherein executable files used to implement the monitor program, the application program, and the predetermined user desktop program, and the virtual operating system folder are stored in a mobile storage device connected to the local host.

6. The virtual desktop implementation method according to claim 2, wherein the to-be-accessed file does not exist in the virtual operating system folder and the operation type is read, and wherein the method further comprises:

duplicating the to-be-accessed file in the local host operating system folder into the virtual operating system folder; and executing, according to the file access request, a read operation on the to-be-accessed file in the virtual operating system folder.

7. The virtual desktop implementation method according to claim 1, wherein the file type further comprises a running file of the application program, and wherein the processing, by the monitor program, the file access request according to the file type further comprises sending the file access request to a to-be-accessed file in a running folder in the remote device when the file type is a running file.

8. The virtual desktop implementation method according to claim 7, wherein executable files used to implement the monitor program, the application program, and the predetermined user desktop program, and the virtual operating system folder are stored in a mobile storage device connected to the local host.

9. The virtual desktop implementation method according to claim 7, wherein sending the file access request to the to-be-accessed file in the running folder in the remote device comprises:

locally caching the to-be-accessed file in the running folder in the remote device when the file type is the running file;

sending the file access request to the locally cached to-be-accessed file;

processing the file access request using a local computing resource; and updating, according to the locally cached to-be-accessed file that has been processed, the to-be-accessed file in the running folder of the remote device.

10. The virtual desktop implementation method according to claim 9, wherein executable files used to implement the monitor program, the application program, and the predetermined user desktop program, and the virtual operating system folder are stored in a mobile storage device connected to the local host.

11. The virtual desktop implementation method according to claim 1, wherein executable files used to implement the monitor program, the application program, the predetermined user desktop program, and the virtual operating system folder are stored in a mobile storage device connected to the local host.

12. A virtual desktop implementation apparatus, comprising:

a processor; and a memory coupled to the processor, wherein the processor is configured to:

intercept a file access request of an application program after the application program is started through a predetermined user desktop program;

obtain file operation information of the file access request intercepted by the monitoring and intercepting module, wherein the file operation information comprises a storage location and an operation type of a to-be-accessed file, and wherein the operation type comprises read and write; and determine, according to the storage location of the to-be-accessed file, a file type of the to-be-accessed file, wherein the file type comprises a system file of an operating system and a program file of the application program;

process the file access request according to the file type, so as to implement a virtual desktop;

send the file access request to a to-be-accessed file in a local virtual operating system folder when the file type is a system file, wherein a file structure in the virtual operating system folder is the same as a file structure in a host operating system folder, and wherein storage locations of the virtual operating system folder and the host operating system folder are different; and send the file access request to a to-be-accessed file in a program folder in a local or remote device when the file type is a program file.

13. The virtual desktop implementation apparatus according to claim 12, wherein the file type further comprises a running file of the application program, and wherein the processor is further configured to send the file access request to a to-be-accessed file in a running folder in the remote device when the file type is a running file.

14. The virtual desktop implementation apparatus according to claim 13, wherein the processor is further configured to:

locally cache the to-be-accessed file in the running folder in the remote device when the file type is the running file;

send the file access request to the locally cached to-be-accessed file;

process the file access request using a local computing resource; and update, according to the locally cached to-be-accessed file that has been processed, the to-be-accessed file in the running folder of the remote device.

15. The virtual desktop implementation apparatus according to claim 12, wherein the processor is further configured to:

detect whether a to-be-accessed file exists in the local virtual operating system folder when the file type is the system file;

send the file access request to the virtual operating system folder;

access the to-be-accessed file in the virtual operating system folder when the to-be-accessed file exists in the local virtual operating system folder and the file type is the system file;

duplicate a to-be-accessed file in a local host operating system folder into the virtual operating system folder when the to-be-accessed file does not exist in the local virtual operating system folder, the file type is the system file, and the operation type of the file access request is write;

execute, according to the file access request, a write operation on the to-be-accessed file in the virtual operating system folder;

send the file access request to the local host operating system folder when the to-be-accessed file does not exist in the local virtual operating system folder and when the operation type is read; and execute, according to the file access request, a read operation on the to-be-accessed file in the local host operating system folder.

16. The virtual desktop implementation apparatus according to claim 12, wherein the processor is further configured to:

detect whether a to-be-accessed file exists in the local virtual operating system folder when the file type is the system file;

send the file access request to the virtual operating system folder;

access the to-be-accessed file in the virtual operating system folder when the to-be-accessed file exists in the local virtual operating system folder and the file type is the system file;

duplicate a to-be-accessed file in a local host operating system folder into the virtual operating system folder when the to-be-accessed file does not exist in the local virtual operating system folder, the file type is the system file, and the operation type of the file access request is write;

execute, according to the file access request, a write operation on the to-be-accessed file in the virtual operating system folder;

duplicate the to-be-accessed file in the local host operating system folder into the virtual operating system folder when the to-be-accessed file does not exist in the local virtual operating system folder and when the operation type is read; and execute, according to the file access request, a read operation on the to-be-accessed file in the virtual operating system folder.

17. The virtual desktop implementation apparatus according to claim 15, wherein the processor is further configured to:

send the file access request to the local host operating system folder when no to-be-accessed file exists in the virtual operating system folder and the operation type is read; and execute, according to the file access request, a read operation on the to-be-accessed file in the local host operating system folder.

18. The virtual desktop implementation apparatus according to claim 15, Wherein the processor is further configured to:

duplicate the to-be-accessed file in the local host operating system folder into the virtual operating system folder when no to-be-accessed file exists in the virtual operating system folder and the operation type is read; and execute, according to the file access request, a read operation on the to-be-accessed file in the virtual operating system folder.

19. A virtual desktop implementation system comprising a host and a remote device, wherein a virtual operating system folder and a virtual desktop implementation apparatus are integrated into the host, and wherein the virtual desktop implementation apparatus is configured to:

intercept a file access request of an application program after the application program is started through a predetermined user desktop program;

obtain file operation information of the file access request intercepted by the monitoring and intercepting module, wherein the file operation information comprises a storage location and an operation type of a to-be-accessed file, and wherein the operation type comprises read and write;

determine, according to the storage location of the to-be-accessed file, a file type of the to-be-accessed file, wherein the file type comprises a system file of an operating system and a program file of the application program; and process the file access request according to the file type, so as to implement a virtual desktop, which comprises:

sending the file access request to a to-be-accessed file in a local virtual operating system folder when the file type is a system file, wherein a file structure in the virtual operating system folder is the same as a file structure in a host operating system folder, and wherein storage locations of the virtual operating system folder and the host operating system folder are different; and sending the file access request to a to-be-accessed file in a program folder in the host or in the remote device when the file type is a program file.

* * * * *

UNITED STATES PATENT AND TRADEMARK OFFICE

CERTIFICATE OF CORRECTION

PATENT NO. : 9,246,992 B2
APPLICATION NO. : 14/476113
DATED : January 26, 2016
INVENTOR(S) : Peng Wang It is certified that error appears in the above-identified patent and that said Letters Patent is hereby corrected as shown below:

Title page item (30), Foreign Application Priority Data should read:

Apr. 5, 2012 (CN) ............................ 201210097482.8

Signed and Sealed this
Twelfth Day of April, 2016

Michelle K. Lee
*Director of the United States Patent and Trademark Office*